(No Model.)
R. W. JONES.
CHECK HOOK.
No. 309,508.   Patented Dec. 16, 1884.
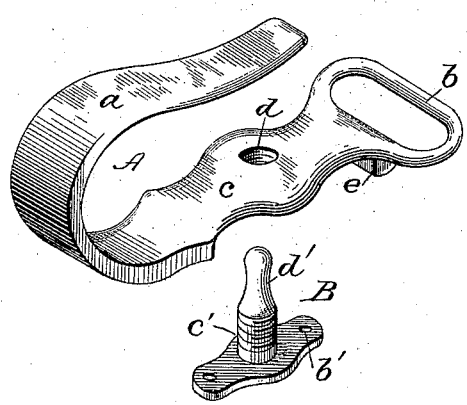
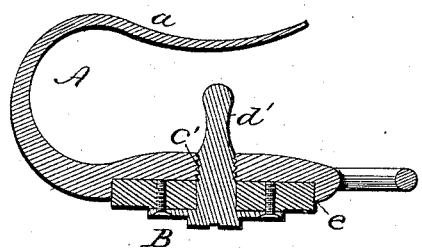
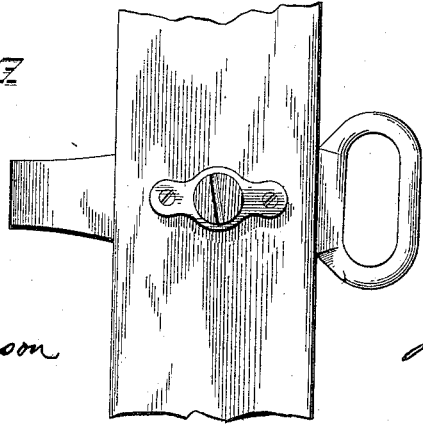
WITNESSES
Frank Clayson
INVENTOR
R. W. Jones

UNITED STATES PATENT OFFICE.

RICHARD W. JONES, OF SYRACUSE, NEW YORK.

CHECK-HOOK.

SPECIFICATION forming part of Letters Patent No. 309,508, dated December 16, 1884.

Application filed October 29, 1884. (No model.)

*To all whom it may concern:*

Be it known that I, RICHARD W. JONES, a citizen of the United States, residing at Syracuse, in the county of Onondaga and State of New York, have invented certain new and useful Improvements in Check-Hooks, of which the following is a specification, reference being had to the accompanying drawings.

Figure 1 is a perspective view of the two parts comprising my invention. Fig. 2 is a vertical central section of the device applied, and Fig. 3 is an inverted plan view.

My invention relates to check or water hooks for harness-pads; and it consists in the peculiar formation of the bottom of the hook and screw-bolt for attaching it to the strap, as will be hereinafter fully explained.

Referring to the drawings, A represents the hook, and B the screw-bolt. The hook proper, marked $a$, and the crupper-strap loop $b$ may be of any usual or approved form. The top portion of the shank $c$ of the hook is also of the ordinary construction, and it is provided with a threaded aperture, $d$, for the reception of the screw-bolt. The under side of the shank is recessed, as at $e$, for the reception of the strap, and is adapted to be applied transversely of the strap in a well-known manner. The screw-bolt B consists of the elongated head portion, $b'$, which may be provided with small apertures near its end for the reception of small supplemental screws, as shown in Figs. 2 and 3; but this feature is non-essential, as these small screws may be wholly dispensed with without materially detracting from the efficacy and security of the fastening. The head $b'$ is provided with a projecting shank, the portion $c'$ of which is screw-threaded to fit the aperture $d$ in the shank of the hook, and is provided with an extension, $d'$, beyond the screw-threaded portion, to form a stop for the check-rein. The under side of the bolt-head is slotted to receive a screw-driver, by means of which the two parts are secured to the strap.

The bolt with its slotted head, screw-threaded shank, and stop are preferably formed in one piece, so that the whole device comprises simply two parts.

In use the strap is applied in the recess on the under side of the shank of the hook. The bolt is inserted through a hole in the strap and through the tapped aperture in the shank of the hook, and screwed home by means of a screw-driver, as before explained. If deemed necessary, small supplemental screws may then be applied through the small apertures near the ends of the bolt-head; but generally this additional security will be found unnecessary.

The device is adapted for any thickness of strap, as will be apparent. When the bolt is screwed home, the unthreaded portion projects above the surface of the shank of the hook a considerable distance and forms a stop for the check-rein, preventing its accidental disengagement from the hook.

I am aware that it is not new to provide a stop for a check-rein, and such I do not claim, broadly, as my invention, but What I do claim as new, and desire to secure by Letters Patent, is—

1. A check-hook for harness-pads, recessed on its under side for the strap, and provided with a screw-tapped aperture, in combination with a bolt having an elongated head and a shank screw-threaded for a portion of its length and not threaded the remaining portion, substantially as set forth.

2. In a harness-pad, the combination of the check-hook A, having recess $e$ and tapped aperture $d$, in combination with bolt B, having the shank $c'$ $d'$, substantially as set forth.

In testimony whereof I affix my signature in presence of two witnesses.

RICHARD W. JONES.

Witnesses:
FRANK CLAYSON,
G. S. HIER.